Patented Aug. 9, 1932

1,870,588

UNITED STATES PATENT OFFICE

WILLIAM A. ROOKER AND VICTOR E. SPEAS, OF KANSAS CITY, MISSOURI, ASSIGNORS TO SPEAS MFG. CO., OF KANSAS CITY, MISSOURI, A CORPORATION OF MISSOURI

FRUIT PRODUCT

No Drawing. Application filed July 31, 1929. Serial No. 382,580.

This invention relates to a new fruit product in concentrated form, characterized by having been purified to such a degree as to be free from the flavors, aromas, colors and undesirable constituents and yet retaining, unaltered and undiminished, the vitamines, minerals and nutritious carbo-hydrate substances of the fruit.

The recorded evidence or history of past races reveals that the nutritious and health-giving properties of fruit have been appreciated by man in all stages of civilization. Modern science has proven these health-giving and anti-scorbutic properties to be due to vitamines and mineral substances and the nutritious value largely due to carbo-hydrates in the form of fruit sugars. No fruit, however, is a universally acceptable food. The aroma or flavor of any specific fruit may be unpalatable or even obnoxious to many people or the fruit may contain some ingredient for which countless individuals have idiosyncrasies. For example, the proteins of strawberries produce symptoms of acute poisoning when consumed by people susceptible to these specific proteins, and the acids of many fruits and the raw starches, the tannins or the pectous substances of others often act in similar manners.

Our invention consists of a fruit product in highly concentrated form, containing all of the desirable fruit constituents, but free from those substances that may create unpleasant reactions when consumed by susceptible individuals. From an economical viewpoint, our product has many inherent advantages. Being in highly concentrated form, it does not require sterilization or the addition of antiseptics to protect it from micro-organisms, as is the case with other fruit products. In packing our product, only six to ten per cent of the containers are required that would be necessary to pack an equivalent amount of fruit in any other form. The savings in freight, handling and storage are of the same magnitude as those secured in the containers or packages. Our process also contemplates the utilization of wholesome fruits that because of over-production, slight blemishes, degree of maturity or distance from a consuming market, cannot be shipped or canned economically.

By suitable means, as later described, we prepare the fruit for subsequent ease of processing and concentrating. The prepared fruit is then treated in such a manner as to remove the tannins, acids, starches, proteins and pectous substances. We are careful, however, to retain the fruit sugars, mineral substances and vitamines. The treated fruit material is then concentrated to any desired degree of concentration and the resulting product is packed in suitable containers.

We have found that the desirable constituents in fruit are largely contained in the juice and that the fibrous or pulp particles are of little value, save to add bulk or roughage to the diet. We, therefore, usually separate the juice from the pulp or marc and use the juice in the preparation of our product. For economy, we may wash the fruit pulp to obtain the traces of adhering or absorbed juice and then combine the washings with the fruit juice for subsequent treatment. However, we do not wish to limit our invention to the utilization of fruit juice alone, for as will be seen from the following example of our method of preparing our product, slight variations will allow for the utilization of the entire fruit. Or, after preparing our product by the full process given, the pulp, fibres or seeds may be recombined with the concentrate obtained. Any fruit may be used for the preparation of our product and we do not limit our invention to any specific fruit or fruit group.

The fruit is first subjected to a suitable cleaning process to remove foreign matter or adhering dirt. Berries and grapes are, of course, stemmed, and apricots, cherries, peaches, etc., are pitted. The washed fruit is then passed through suitable grinding or crushing equipment to rupture the fruit cells and free the contained juice. The crushing or grinding equipment should preferably be made of bronze, monel or similar fruit acid resisting material. The juice is then separated from the crushed fruit, which should be done as soon as possible to prevent the formation of oxidase colors that may be objectionable in the finished product. The removal of the juice may be accomplished by pressing in suitable presses or by leaching or diffusing with water.

The fruit juice, or mixture of juice and water is placed in a suitable container and the tannins are removed by precipitating with protein. The amount of protein required depends upon the tannin content of the fruit being used and the degree of dilution of the original fruit juice. Usually, 0.1 to 0.5% of the weight of the juice is sufficient. In practice, we aim for complete removal of the tannin and add a slight excess of protein. Although comparatively expensive, we prefer to use a protein in the form of fresh egg albumin, as we have found that an excess of protein in this form can be readily removed from the fruit juice by heat coagulation at relatively low temperatures or by using a protolytic enzyme. We usually employ the enzymes, as they do not harm the vitamines as might be the case if, through carelessness or an accident, the juice was overheated while endeavoring to coagulate the albumin by heat. By keeping the temperature of the juice below 18–20° C., the combination of the protein and tannin forms rapidly and can be separated from the fruit juice by any desired means, such as filtering, settling, or centrifuging. We prefer the latter process and employ high speed centrifuges of the rotor packing type.

The tannin-free juice is then treated with diastase, protease and pectase to free the juice of all starch, pectous substances and added or natural proteins. The enzymes may be obtained from any source, but we prefer an aqueous extract of desiccated Aspergillus Oryzae as the diastatic and proteolytic enzyme and a fresh, concentrated infusion of clover for the pectolytic enzyme. The amounts of the enzymes required will depend, of course, upon the starch, protein and pectous contents of the fruit juice and upon the relative strength of the enzymes employed.

When the enzyme reactions have reached completion as indicated by the customary tests, i. e., checks with iodine solution, Muller's reagent, etc., a sufficient quantity of calcium carbonate is added to precipitate in the form of calcium salts, the natural acids of the fruit and those formed by the hydrolysis of the proteins and pectous substances. In practice, the acid may be removed completely or a trace may be left in the fruit juice. A slight trace of acid in the finished product is sometimes an advantage in retaining light color and a high degree of clarity. Most of the acid should be removed, however, because as mentioned previously, many individuals have idiosyncrasies for fruit acids. Any excess of calcium carbonate and the calcium salts formed as mentioned above, being insoluble in the juice, may be easily removed by filtering, settling or centrifuging. We have found, however, that it is not necessary to remove these insoluble substances at this stage of the process but do so at a later stage, as will be subsequently described.

The neutralized juice is next treated with decolorizing, deodorizing and deflavorizing substances, such material being fuller's earth or an activated carbon or a combination of both. The amount required depends upon the color, odor and flavor to be removed from the particular juice being treated. We have found in average practice and using activated carbon, 0.2 to 1.0% of the weight of the juice is the amount of carbon required. After adding the decolorizing material and thoroughly mixing the same, heat is applied to the mass and the temperature is brought slowly to 140–145° Fahr. This temperature is maintained until the colors, aromas and flavors have been adsorbed by the activated material. The exact end point can be easily determined by filtering a small portion of the juice being treated and then examining the filtrate. Note that in our entire process to this stage, no heat has been applied to the juice. In this specific step, we have found that although somewhat higher temperatures may not affect the vitamines, their full value is more perfectly retained by using temperatures at or below those given, i. e., 140 to 145° Fahr.

When a sample of the juice gives a filtrate free of color and flavor, the juice should be filtered at once to remove the decolorizing agent, any particles of fruit pulp, the excess of calcium carbonate and the calcium salts formed during the neutralization of the acids. The filtration may be conducted in any of the usual commercial filters. We, however, prefer plate and frame filters and use diatomaceous earth as a filtering aid.

The filtered juice is then concentrated in vacuum equipment, preferably at temperatures not in excess of 120° Fahr. Any desired degree of concentration may be obtained. In practice, our finished product contains 70 to 80 percent of soluble solids.

As illustrated by the process example given, our product is prepared in such a manner as to be free from fruit flavors and aromas that may be unpalatable to some individuals and is also free from the proteins, acids, starches and pectous substances for which many have idiosyncrasies. We have retained, however, the vitamines, minerals and nutritious substances of the fruit.

Being without flavor, our product allows for the addition of any flavoring material that is to the particular liking of the consumer. For example, maple flavor may be added to our product and a delectable highly nutritious table syrup results. Such a syrup is preferable to any other syrup on the market for its sweetening ingredients consist entirely of the highly nutritious and easily assimilated fruit sugars.

The medical profession has long recognized the fact that fruit sugars, being largely invert sugars, are in a measure, predigested and are consequently easily assimilated by even the most delicate constitutions, this being in marked contrast to sucrose, commonly known as beet or cane sugar, which must be inverted by the gastric juices before it can be absorbed and utilized by the human body.

Of equal, if not of greater importance, is the fact that our product contains the health-insuring vitamines and body-building minerals of fresh fruit. In this respect, one pound of our product contains the same amount of fruit vitamines and fruit minerals as would be found in 5 to 10 pounds of fresh fruit. Our product being without color, flavor or aroma, may be used to advantage in or with these foods to which sugar or honey is normally added.

Our product will be of exceptional value to armies, expeditions and exploring parties, where utmost economy in the bulk or weight of food supplies is so essential and where a universally acceptable fruit substance is a necessary part of the diet as a preventive of scurvy.

While we have herein described an illustrative embodiment of the invention and a process for producing the same, it is to be understood that the invention is not limited thereto but comprehends other compositions, and process steps not departing from the spirit of the invention.

Having disclosed our invention, we claim:

1. The process of producing a fruit product, comprising the steps of treating the juice of the fruit with protein matter to remove tannin, treating the tannin free juice with enzymes to convert the starch, proteins, and pectous substances, and neutralizing the acid of the juice.

2. The process of producing a fruit product, comprising the steps of treating the juice of the fruit with protein matter to remove tannin, treating the tannin free juice with enzymes to convert the starch, proteins, and pectous substances, and neutralizing the acid of the juice, and treating with an adsorptive or activated substance to remove color, odor and flavor.

3. The process of producing a fruit product, comprising the steps of treating the juice of the fruit with protein matter to remove tannin, treating the tannin free juice with enzymes to convert the starch, proteins, and pectous substances, and neutralizing the acid of the juice, and concentrating the juice at a temperature not to exceed 120° F.

4. The process of producing a fruit product, comprising the steps of treating the juice of the fruit with protein matter to remove tannin, treating the tannin free juice with enzymes to convert the starch, proteins, and pectous substances, and neutralizing the acid of the juice, treating with an adsorptive or activated substance to remove color, odor and flavor, and concentrating the juice at a temperature not to exceed 120° F.

5. The process of producing a fruit product, comprising the steps of treating the juice of the fruit with protein matter to remove tannin, treating the tannin free juice with enzymes to convert the starch, proteins, and pectous substances, and neutralizing the acid of the juice, and concentrating the juice at a temperature insufficient to destroy the vitamines and nutritious matter in the juice.

6. The process of producing a fruit product, comprising the steps of treating the juice of the fruit with protein matter to remove tannin, treating the tannin free juice with enzymes to convert the starch, proteins, and pectous substances, and neutralizing the acid of the juice, treating with an adsorptive or activated substance to remove color, odor and flavor and concentrating the juice at a temperature insufficient to destroy the vitamines and nutritious matter in the juice.

In witness whereof we hereunto subscribe our names to this specification.

WILLIAM A. ROOKER.
VICTOR E. SPEAS.